United States Patent
Chilton et al.

(10) Patent No.: US 12,050,880 B1
(45) Date of Patent: Jul. 30, 2024

(54) SYSTEM AND METHOD FOR CONTENT CREATION

(71) Applicant: Cengage Learning, Inc., Boston, MA (US)

(72) Inventors: James Chilton, Hollis, NH (US); Peter Griffiths, North Weymoth, MA (US); Charles Qian, Cincinnati, OH (US)

(73) Assignee: Cengage Learning, Inc., Boston, MA (US)

( * ) Notice: Subject to any disclaimer, the term of this patent is extended or adjusted under 35 U.S.C. 154(b) by 0 days.

(21) Appl. No.: 18/392,036

(22) Filed: Dec. 21, 2023

(51) Int. Cl.
  *G06F 40/40*   (2020.01)
  *G06F 16/953*  (2019.01)

(52) U.S. Cl.
  CPC ............ *G06F 40/40* (2020.01); *G06F 16/953* (2019.01)

(58) Field of Classification Search
  CPC ............................... G06F 40/40; G06F 16/953
  USPC ............................................................ 704/9
  See application file for complete search history.

(56) References Cited

U.S. PATENT DOCUMENTS

| | | | |
|---|---|---|---|
| 9,183,560 B2* | 11/2015 | Abelow | G06Q 30/0601 |
| 11,029,819 B2* | 6/2021 | Gerges | G06F 40/258 |
| 11,222,298 B2* | 1/2022 | Abelow | G06Q 10/067 |

\* cited by examiner

*Primary Examiner* — Susan I McFadden
(74) *Attorney, Agent, or Firm* — Goodwin Procter LLP

(57) ABSTRACT

In a first aspect, a system for creating fact-based content is presented. The system includes an application service provider operating on a network. The application service provider is configured to receive a user prompt and generate a web query for content based on the user prompt. The system includes a fact-based language model in communication with the application service provider. The fact-based language model is configured to receive the web query from the application service provider and retrieve, from a electronic library, relevant fact-based content based on the web query. The electronic library includes proprietary data. The fact-based language model is configured to provide the relevant fact-based content to the application service provider. The application service provider communicates content to a user based on the user prompt. The content includes at least a portion of the relevant fact-based content from the electronic library.

18 Claims, 6 Drawing Sheets

SYSTEM AND METHOD FOR CONTENT CREATION

TECHNICAL FIELD

The present disclosure generally relates to content curation and distribution. In particular, the present disclosure relates to systems and methods for fact-based content provisioning.

BACKGROUND

Many individuals may search for various forms of content on the Internet through one or more application service providers, search engines, etc. However, with the increasing use of language models, many results of user searches may have data that may be inaccurate, misleading, or speculative.

SUMMARY

In a first aspect, a system for creating fact-based content is presented. The system includes an application service provider operating on a network. The application service provider is configured to receive a user prompt and generate a web query for content based on the user prompt. The system includes a fact-based language model in communication with the application service provider. The fact-based language model is trained with training data correlating prompts to content. The fact-based language model is trained to receive prompts as input and provide fact-based content as output. The fact-based language model is configured to receive the web query from the application service provider and retrieve, from a electronic library, relevant fact-based content based on the web query. The electronic library includes proprietary data. The fact-based language model is configured to provide the relevant fact-based content to the application service provider. The application service provider communicates content to a user based on the user prompt. The content includes at least a portion of the relevant fact-based content from the electronic library.

The fact-based language model is configure to retrieve relevant fact-based content based on an access status of the application service provider. The proprietary data of the electronic library includes one of textbooks, journals, whitepapers, professor notes, or a combination thereof. The application service provider is configured to provide an indication of a source of the at lest a portion of the relevant fact-based content. The application service provider includes a search engine. The fact-based language model is configured to provide different forms of relevant fact-based content based on an identity of the application service provider. The user prompt is a request for fact-based content. The fact-based language model is configured to identify a level of knowledge of the user prompt and retrieve, from the electronic library, relevant fact-based content based on the level of knowledge of the user prompt. The application service provider includes a language model. The language model of the application service provider communicates data with the fact-based language model. The fact-based content includes text, image, video, or a combination thereof.

In another aspect, a method of creating fact-based content is presented. The method includes receiving a user prompt at an application service provider operating on a network, The method includes generating a web query for content based on the user prompt and by the application service provider. The method includes receiving the web query from the application service provider at a fact-based language model in communication with the application service provider. The fact-based language model is trained with training data correlating prompts to content. The fact-based language model is trained to receive prompts as input and provide fact-based content as output. The method includes retrieving relevant fact-based content based on the web query from a electronic library. The electronic library includes proprietary data. The method includes providing the relevant fact-based content to the application service provider from the fact-based language model. The method includes displaying the content to a user based on the user prompt. The content includes at least a portion of the relevant fact-based content from the electronic library.

The method includes retrieving relevant fact-based content based on an access status of the application service provider. The proprietary data of the electronic library includes one of textbooks, journals, whitepapers, professor notes, or a combination thereof. The method includes providing an indication of a source of the at least a portion of the relevant fact-based content. The application service provider includes a search engine. The method includes providing different forms of relevant fact-based content based on an identity of the application service provider. The user prompt is a request for fact-based content. The method includes identifying a level of knowledge of the user prompt and retrieving relevant fact-based content based on the level of knowledge of the user prompt. The application service provider includes a language model. The language model of the application service provider communicates data with the fact-based language model. The fact-based content includes text, image video, or a combination thereof.

BRIEF DESCRIPTION OF THE DRAWINGS

These and other features, aspects, and advantages of the present disclosure will become better understood with regard to the following description and accompanying drawings.

DETAILED DESCRIPTION

At a high level, aspects of the present invention can be used to create, protect and provide fact-based content. In particular, aspects of the present invention can be used to provide fact-based content to one or more application service providers within and/or as part of a generative language model. In some implementations, the present invention provides for incorporating fact-based content from a fact-based language model with other content curated or collected by an application service provider and. Various access statuses employed by application service providers within their user applications may be used to change a degree of fact-based content that may be provided in response to queries or prompts.

Figure 1:
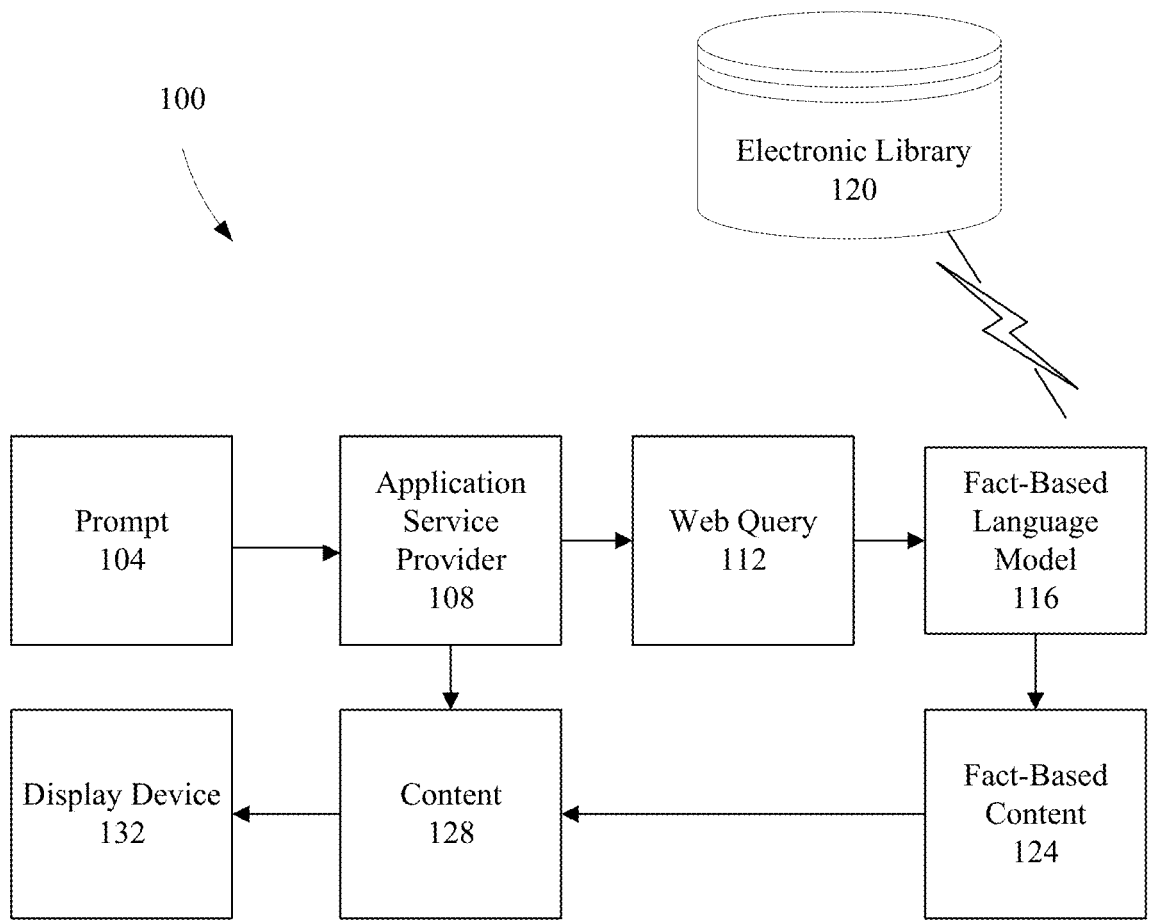
FIG. 1 illustrates a block diagram of an exemplary embodiment of a system for content creation.

Referring now to FIG. 1, system 100 for content creation and distribution is presented. System 100 may include application service provider 108 and fact-based language model 116. An "application service provider" as used in this disclosure is any entity that provides data through one or more applications. Application service providers 108 may include, but are not limited to, search engines, language models, and the like. Application service provider 108 may be configured to receive one or more prompts 104 and provide content 128 based on and in response to the one or more prompts 104. Prompt 104 may include, but is not limited to, a request for educational content, an inquiry about an event, an inquiry about a law of nature, scientific information, historical information, biographical information, and the like. Prompt 104 may include any question that may be generated by a user, without limitation. A user may provide prompt 104 to application service provider 108 through a graphical user interface (GUI) of application service provider 108. In some embodiments, a user may provide prompt 104 through a mouse, keyboard, touchscreen, voice recognition-enabled software, and the like to a computing device operable to communicate with application service provider 108.

Application service provider 108 may include one or more language models within or alongside its application(s). Language models may include one or more natural language processing (NLP) models, large language models (LLM), and/or other language models. Application service provider 108 may utilize a Markov chain and/or Hidden Markov Model (HMM), in some embodiments. A language model of application service provider 108 may be configured to identify words, letters, phrases, and the like from prompt 104. Application service provider 108 may extract linguistic data from prompt 104, in some embodiments. Based on prompt 104, application service provider 108 may generate web query 112. A "web query" as used in this disclosure is any request for information that can be communicated digitally. Web query 112 may include one or more characters, strings, letters, symbols, and the like. In some embodiments, web query 112 may include one or more keywords and/or key phrases that application service provider 108 may have identified from prompt 104. As a non-limiting example, prompt 104 may include a question of "What are the different states of matter?" to which application service provider 108 may generate a web query 112 including key words and phrases of "states" "matter" "different" "states of matter" and the like. Application service provider 108 may run web query 112 through one or more search engines. Search engines may be configured to search through the Internet to find data. Application service provider 108 may search through one or more databases with web query 112. In some embodiments, application service provider 108 may communicate web query 112 (or portions thereof) to fact-based language model 116.

Fact-based language model 116 may include an LLM, NLP, and/or other language model(s). Fact-based language model 116 may be trained with training data correlating prompts 104 to fact-based content 124. Fact-based language model 116 may be trained with human input, which may correct factual deficiencies of responses of fact-based language model 116 such as inaccurate statements. Training data used for fact-based language model 116 may be received through user input, external computing devices, and/or previous iterations of processing. Fact-based language model 116 may include one or more neural networks. A neural network may include a collection of interconnected nodes, where each node may represent a value. A neural network of fact-based language model 116 may include one or more layers, such as, but not limited to, an input layer, a hidden layer, and/or an output layer. In some embodiments, Fact-based language model 116 may include one or more transformer layers. A transformer layer may be a neural network architecture that may follow an encoder-decoder structure without reliance on recurrent and/or convolutions to generate an output. One or more transformer layers of Fact-based language model 116 may be configured to inputs words and output associations of the words, such as type of words like nouns, adverbs, verbs, adjectives, and the like. In some embodiments, a first transformer layer may determine a type of word and a second transformer layer may determine an association with the word. For instance and without limitation, a first transformer layer may determine "bank" to be a noun and a second transformer layer may determine "bank" to relate to a financial institution and not a river bank. Fact-based language model 116 may include a plurality of transformer layers. In some embodiments, Fact-based language model 116 may include a machine learning module such as described below with reference to FIG. 6, without limitation.

In some embodiments, training data of fact-based language model 116 may use fact-based content 124 which may be derived from electronic library 120. "Fact-based content" as used in this disclosure is a form of information that is irrefutable. For instance and without limitation, fact-based content 124 may include information on gravity, history, English, Spanish, electromagnetism, circuit theory, radio theory, chemistry, mechanical engineering, and/or other forms of information that can be determined as factual. As a non-limiting example, fact-based content 124 may include content such as "Voltage is equal to resistance multiplied by current, or V=IR", or "the Declaration of Independence was signed on Jul. 4, 1776."

Electronic library 120, which may be in communication with fact-based language model 116, may be generated by proprietary data. "Proprietary data" as used in this disclosure is a form of data that is privately owned or has other limitations on its use and/or distribution, typically implemented using licenses, or other contractual or digitally implemented restrictions. Proprietary data of electronic library 120 may include, but is not limited to, textbook passages, textbook notes, professor notes, whitepapers, journals, video transcripts, questions and answers of exams and/or quizzes, and/or other forms of data. Electronic library 120 may be described in further detail below with reference to FIG. 2.

Still referring to FIG. 1, fact-based language model 116 may be configured to receive web query 112. Fact-based language model 116 may analyze one or more words, phrases, letters, symbols, characters, and the like of web query 112. In some embodiments, fact-based language model 116 may extract linguistic data of web query 112. "Linguistic data" as used in this disclosure is information relating to text. Linguistic data may include one or more words, characters, symbols, numbers, strings of characters and/or words, questions, and the like. Linguistic data may include punctuation, diacritic marks, engineering symbols, geometric dimensioning and tolerancing (G-D&T) symbols, chemical symbols and formulas, spaces, whitespace, and/or other symbols. Linguistic data may be parsed into tokens, which may include a word, sequence of characters, and the like. The term "token," as used herein, refers to any smaller, individual groupings of text from a larger source of text. Tokens may be broken up by word, pair of words, sentence, or other delimitation. Tokens may in turn be parsed in various ways. Linguistic data 120 may be parsed into words or sequences of words, which may be considered words as well. Linguistic data may be parsed into "n-grams", where all sequences of n consecutive characters may be considered. Any or all possible sequences of tokens or words may be stored as "chains", for example for use as a Markov chain or Hidden Markov Model, without limitation.

From these tokens, fact-based language model 116 may generate one or more word vectors. A word vector is a vector space representing a word. A vector space, which may be a collection of vectors, may be a set of mathematical objects that can be added together under an operation of addition following properties of associativity, commutativity, existence of an identity element, and existence of an inverse element for each vector. Mathematical objects may be multiplied by scalar values under an operation of scalar multiplication compatible with field multiplication, and may have an identity element that may be distributive with respect to vector addition, and/or may be distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space. As a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element. Vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. A degree of similarity may include any other geometric measure of distance between vectors.

Linguistic data may include, but is not limited to, words, characters, verbs, nouns, adjectives, adverbs, contexts, and the like. In some embodiments, fact-based language model 116 may utilize linguistic data to retrieve fact-based content 124 from electronic library 120. Fact-based language model 116 may be configured to retrieve and/or produce fact-based content 124 based on prompt 104 and/or web query 112. Fact-based language model 116 may give one or more words, characters, and the like of linguistic data 120 one or more weights. Weights may be a value out of 1, 10, 100, and the like. For instance, and without limitation, prompt 104 may include "how do ionic bonds work?" to which fact-based language model 116 may give a weight of 0.4 to "ionic", 0.3 to "bonds" and each of "how", "do", and "work" a value of 0.1 respectively for a total value of 1. Weights may be automatically adjusted and/or tuned by fact-based language model 116. In other embodiments, a user may give certain weights to certain words for fact-based language model 116 to utilize.

Fact-based language model 116 may provide fact-based content 124 to application service provider 108, in some embodiments. Application service provider 108 may combine fact-based content 124 with content 128 retrieved from one or more other databases or sources of information, which in some instances may be sourced from a third party. Application service provider 108 may communicate with a display device 132 to display content 128. Display device 132 may include, but is not limited to, smartphones, laptops, monitors, televisions, and the like. In some embodiments, application service provider 108 may display an indication of a source of content 128, which may include fact-based content 124. For instance and without limitation, application service provider 108 may display an asterisk, footnote indicator or other reference identifier, such as, but not limited to, a citation, next to a form of content 128 that contains fact-based content 124 and a statement next to the identifier as to the source the fact-based content 124.

In some embodiments, fact-based language model 116 may determine fact-based content 124 based on an access status of a user and/or application service provider 108. An "access status" as used in this disclosure is an identification of content privileges of a user or application service provider. An access status may include a subscription level to fact-based language model 116 and/or electronic library 120. A subscription access to fact-based language model 116 and/or electronic library 120 may allow application service provider 108 and/or a user to receive various levels of fact-based content 124. For instance, and without limitation, fact-based language model 116 and/or electronic library 120 may be provided as a subscription-based service. A user and/or application service provider 108 may subscribe to various tiers of access to fact-based 124 that may be retrieved from electronic library 120. Subscription levels may include, but are not limited to, free, basic, premium, premium plus, and/or other levels of a subscription. Various levels of subscriptions may categorize one or more users to various tiers. For instance and without limitation, a basic subscription may categorize a user to a basic tier which may allow the user to access basic forms of fact-based content 124 while preventing the user from accessing more advanced fact-based content 124. In some embodiments, a subscription may have an access term such as, but not limited to, a day, week, month, year, and the like. At an end of a subscription access term, a user and/or application service provider 108 may no longer be able to access fact-based content 124. Subscriptions to fact-based language model 116 and/or electronic library 120 may take the form of accessing one or more API's in communication with fact-based language model 116 and/or electronic library 120. Fact-based language model 116 may provide varying levels of depth of fact-based content 124. For instance and without limitation, fact-based language model 116 may restrict portions of fact-based content 124 based on, but not limited to, prompt 104, access status of application service provider 108, and/or other factors.

In some embodiments, fact-based language model 116 may reuse one or more access statuses and/or subscription tiers and/or fact-based content 124 corresponding to the access statuses. By reusing access statuses, in some embodiments, fact-based language model 116 may save on processing power of a processor and/or one or more graphics processing units (GPUs) in communication with fact-based language model 116 by limiting processing of fact-based content 124 to specific access statuses. In some embodiments, replication of access statuses may allow for scaling of fact-based language model 116 across many users, organizations, and the like. Access statuses may allow for disconnecting of certain material of fact-based content 124 from access to one or more users at a later date than an initial date of access. For instance, an access status of a user may modify access of fact-based content 124 to the user based on one or more factors. Modified access may include expanding access to additional fact-based content 124 and/or decreasing accessible fact-based content 124 for a user. Factors that may contribute to modification of access statuses include, but are not limited to, changing of user data, new fact-based content 124 added to electronic library 120, and/or other factors.

Still referring to FIG. 1, in some embodiments, application service provider 108 may combine search results of web query 112 from one or more databases with fact-based content 124 in a ratio. For instance and without limitation, a ratio of 1:1, 100:1, 1:100, and/or any ratios in between of content 128 to fact-based content 124 may be used.

Figure 2:
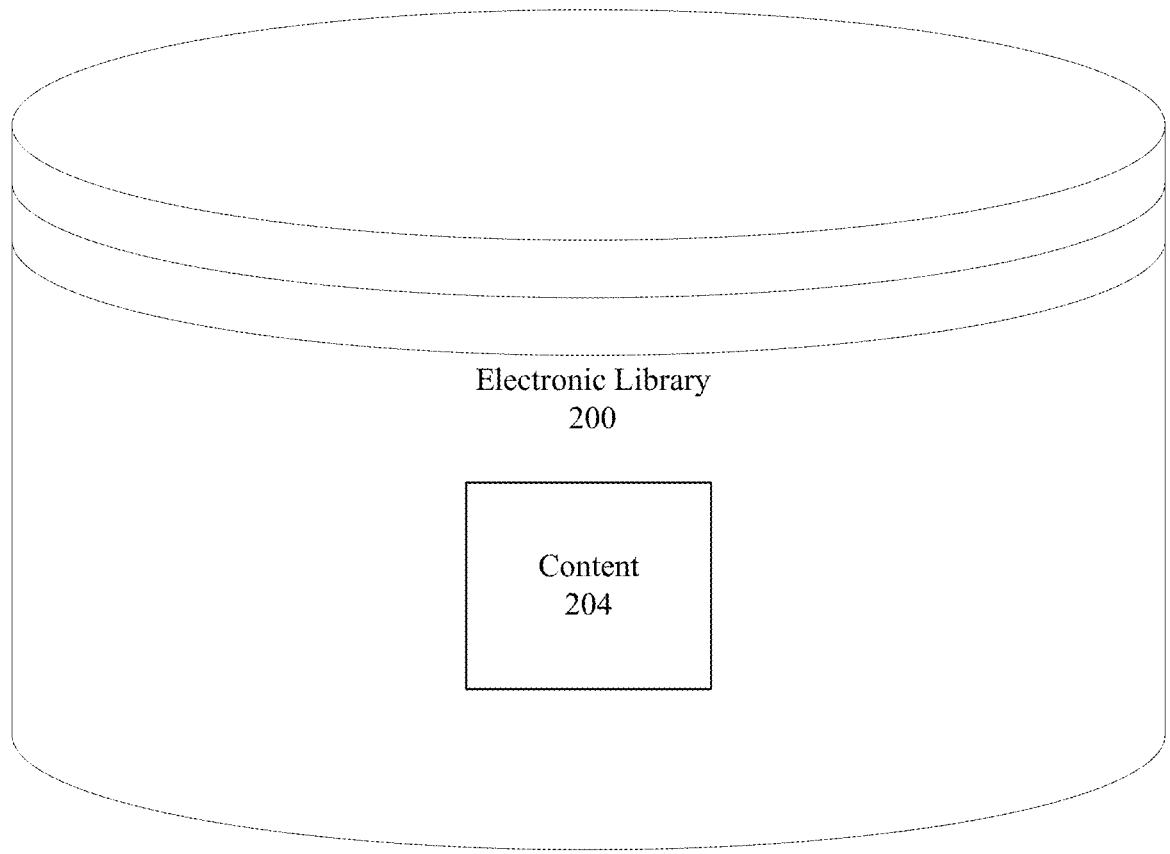
FIG. 2 illustrates an exemplary embodiment of a electronic library.

Referring to FIG. 2, the methods and systems described herein may include electronic library 200, which may be the same or similar to electronic library 120 as described above with reference to FIG. 1. Electronic library 200 may be a relational or other database. Electronic library 200 may be an XML, SQL, XQuery, or other database. In some embodiments, electronic library 200 may have a plurality of rows and columns, tables, and the like. Electronic library 200 may include content 204. Content 204 may be the same as fact-based content 124 as described above with reference to FIG. 1. In some embodiments, content 204 may include a plurality of data relating to science, history, English, mathematics, and/or other types of data. Content 204 may be categorized into one or more categories, such as, but not limited to, mathematics, physics, chemistry, World War II, English, law, business, and/or other categories, without limitation. Content 204 and/or other data of electronic library 200 may be sourced from one or more fact sources. Fact sources may include, but are not limited to, professor notes, whitepapers, journals, University materials, College materials, online databases, and the like. Fact sources may be proprietary. A classifier may be used to categorize content 204 into one or more categories. For instance, a classifier may be configured to classify content 204 to one or more categories, such as, but not limited to, math, science, history, English, and/or other categories. A classifier may be trained with training data correlating educational content 204 to one or more categories. Training data may be received through user input, external computing devices, and/or previous iterations of processing. In some embodiments, fact-based language model 116, as described above with reference to FIG. 1, may classify content 204 to one or more categories. Content 204 may be categorized and/or otherwise classified to one or more forms of data, such as journals, whitepapers, video transcripts, professor notes, and/or other forms of data, such as described above with reference to FIG. 1.

With continued reference to FIG. 2, electronic library 200 may be proprietary (e.g., subject to copyright and/or licensing restrictions imposed by the author or owner of the materials in electronic library 200. In some cases, electronic library 200 may comprise proprietary materials from more than one owner/licensor/author, and the use of content 204 may be limited to only the data for which the user has been granted or acquired the necessary rights. In some embodiments, electronic library 200 may store or otherwise categorize content 204 by owners, licensors, authors, and the like, without limitation. For instance, a first collection of content 204 may be available under a specific license to Suffolk University while a second collection of content 204 may be available under a specific license to Northeastern University. Proprietary content 204 may include materials from, but not limited to, professors, companies, corporations, tutors, and/or other entities. For instance, content 204 may be selected and/or provided by an entity such as, but not limited to, a tutor, teacher, school, college, university, and the like. Content 204 may be generated by one or more individuals, such as, but not limited to, tutors, teachers, professors, teaching assistants, and/or other individuals. Content 204 may be generated for specific classes, courses, and/or other academic purposes. As a non-limiting example, educational content 204 may include a proprietary lecture on electromechanics generated by a professor at the Massachusetts Institute of Technology (MIT). As another non-limiting example, content 204 may include Calculus III questions and answers generated by a college-level math tutor. Content 204 may be added to from one or more individuals through networks, servers, or other wireless devices. For instance, an English teacher may add English lessons to content 204 over a web portal.

In some embodiments, content 204 may include data retrieved through one or more databases, online resources, and the like. For instance, as described above with reference to FIG. 1, fact-based language model 116 may search through the Internet for content and/or data. Fact-based language model 116 and/or other processes and/or individuals may add content 204 to electronic library 200 based on criteria. Criteria may include one or more standards for acceptance of content 204 into electronic library 200. Standards may include, but are not limited to, age of data, size of data, author of data, source of data, and the like. For instance, fact-based language model 116 and/or a computing device may compare publication dates of content 204 to ensure the most up-to-date content 204 is used. Electronic library 200 may use a proprietary system to obtain and/or store content 204. A proprietary system may include obtaining content 204 from one or more entities, retrieving content 204 from selected online sources, and/or other methods as described above, without limitation.

Continuing to refer to FIG. 2, in some embodiments, electronic library 200 may include a combination of proprietary and non-proprietary content 204. For instance, and without limitation, content 204 may include coding language data from a public online source and data from a specific coding tutor. In some embodiments, there may be a ratio of proprietary data to non-proprietary data. A ratio may be selected based on subject matter, educational levels such as middle school, high school, undergrad, graduate, and/or other factors. Ratios may include anywhere between about 1:1, 100:1, 1:100, and/or other ranges. As a non-limiting example, content 204 may include a ratio for high school history of about 4:1 of non-proprietary to proprietary content 204.

Figure 3:
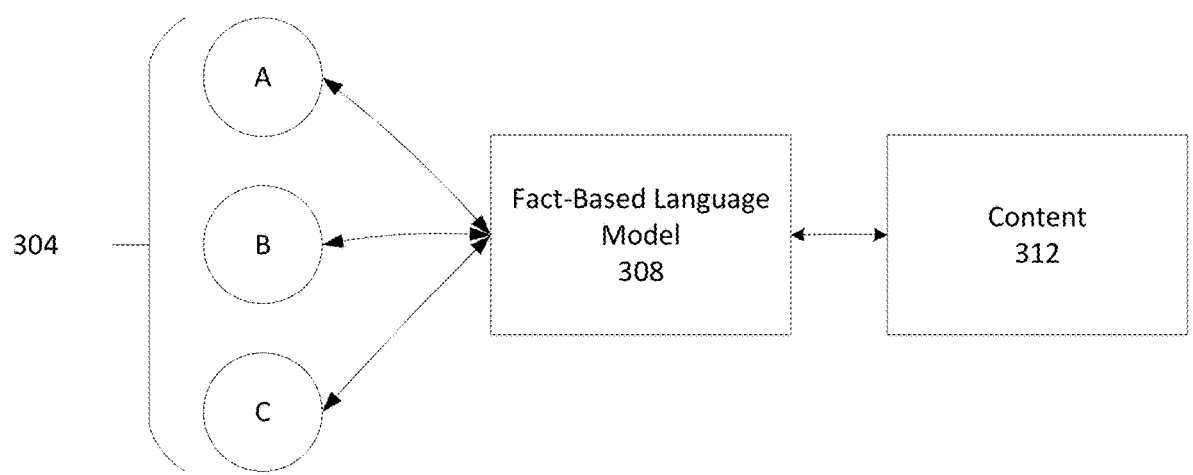
FIG. 3 illustrates an exemplary embodiment of a framework of accessing content.

Referring now to FIG. 3, an illustration of different tiered users accessing educational content is shown. Users 304 may include user A, B, and C. Users A, B, and C, may all have different access statuses. For instance, user A may have an access status level of 1, being a most basic level. User B may have an access status level of 2, being a moderate tier level. User C may have an access status level of 3, being a most advanced tier level. User A may have limited access to educational content 312 through fact-based language model 308. Fact-based language model 308 and content 312 may be as described above with reference to FIG. 1. In some embodiments, user B may have wider access to content 312 than user B. User C may have the most access to content 312, more than both user A and user B. The various access levels to content 312 may include, but are not limited to, areas of study, depth of knowledge, forms of content, and the like. In some embodiments, users 304 A, B, and C, may be application service providers as described above with reference to FIG. 1. Fact-based language model 308 may be configured to provide differing content 312 to each of users 304 A, B, and C for a same prompt based on access statuses, identities, and/or other factors of users A, B, and C.

In a case of users 304 being application service providers, users 304 may retrieve their own content in addition to requesting content from fact-based language model 308. In an embodiment, an end result of content created by application service providers may be a combination of content sourced from the Internet and content 312 received from fact-based language model 308. In some embodiments, fact-based language model 308 may be configured to provide various forms of content 312 based on one or more identities of users 304. For instance and without limitation, an identity of user A of users 304 may correspond to textbook only content 312, while an identity of users B and C may correspond to video transcripts of content 312. In some embodiments, fact-based language model 308 may be configured to determine a level of knowledge from one or more prompts received from one or more users 304. For instance, a question of "why is the sky blue" in a prompt may cause fact-based language model 308 to retrieve content 312 of "the sky is blue due to Rayleigh scattering". A more in-depth question, such as "what is quantum tunneling?" may generate a more in-depth response from fact-based language model 308 with content 312 of "quantum tunneling is a phenomenon in quantum mechanics in which an object such as an electron or atom passes through a potential energy barrier."

Figure 4:
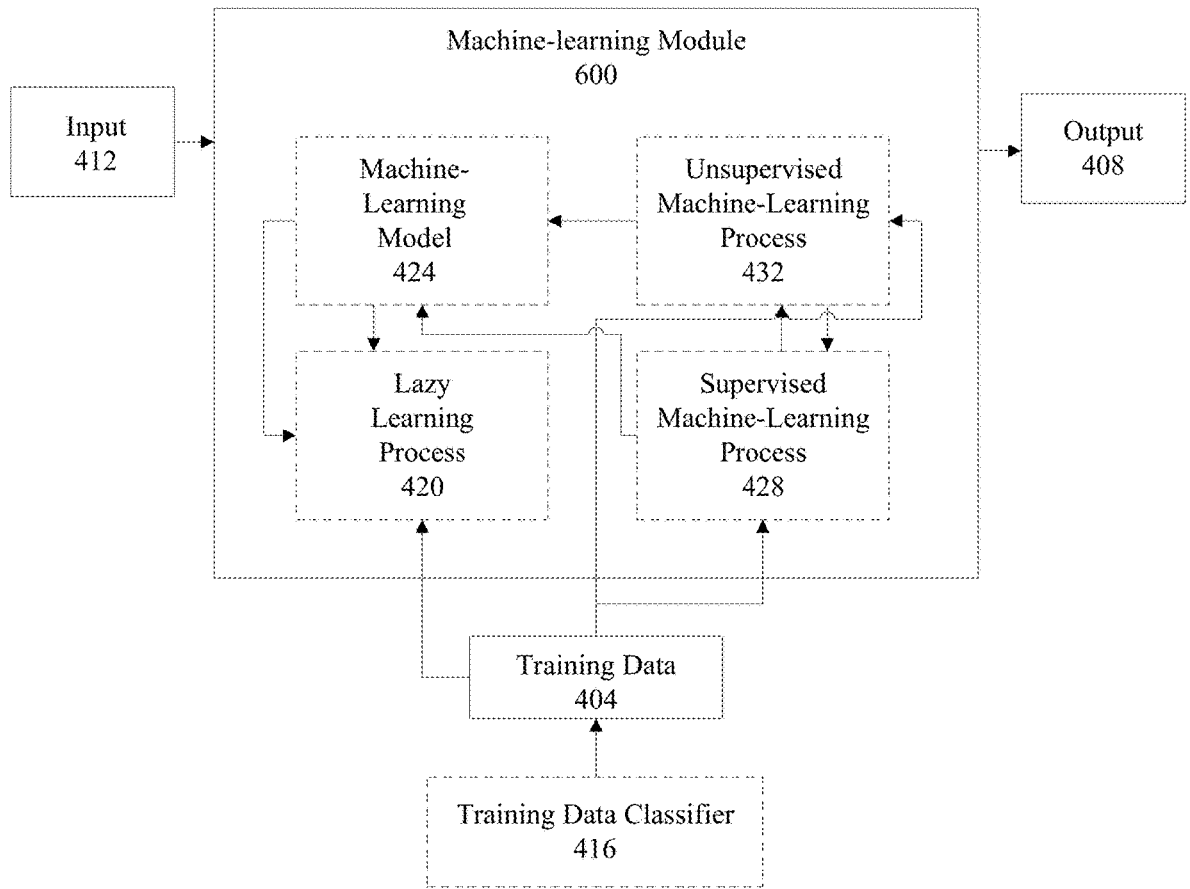
FIG. 4 illustrates a block diagram of users in different access statuses accessing content books.

FIG. 4 illustrates an exemplary embodiment of a machine-learning module 400 that may perform one or more machine-learning processes as described herein. Machine-learning module 400 may be configured to perform various determinations, calculations, processes and the like as described in this disclosure using a machine-learning process. A "machine learning process," as used in this disclosure, is a process that automatedly uses training data to generate an algorithm that calculates outputs given data as inputs. A machine learning process contrasts to a non-machine learning software program where the commands to be executed are determined in advance by a user and written in a programming language.

Still referring to FIG. 4, machine learning module 400 may utilize training data 404. "Training data," as used herein, refers to data containing correlations that a machine-learning process may use to model relationships between two or more categories of data elements. For instance, and without limitation, training data 404 may include a plurality of data entries, each entry representing a set of data elements that were recorded, received, and/or generated together. Training data 404 may include data elements that may be correlated by shared existence in a given data entry, by proximity in a given data entry, or the like. Multiple data entries in training data 404 may demonstrate one or more trends in correlations between categories of data elements. For instance, and without limitation, a higher value of a first data element belonging to a first category of data element may tend to correlate to a higher value of a second data element belonging to a second category of data element, indicating a possible proportional or other mathematical relationship linking values belonging to the two categories.

Multiple categories of data elements may be related in training data 404 according to various correlations. Correlations may indicate causative and/or predictive links between categories of data elements, which may be modeled as relationships such as mathematical relationships by machine-learning processes as described in further detail below. Training data 404 may be formatted and/or organized by categories of data elements. Training data 404 may, for instance, be organized by associating data elements with one or more descriptors corresponding to categories of data elements. As a non-limiting example, training data 404 may include data entered in standardized forms by one or more individuals, such that entry of a given data element in a given field in a form may be mapped to one or more descriptors of categories. Elements in training data 404 may be linked to descriptors of categories by tags, tokens, or other data elements. Training data 404 may be provided in fixed-length formats, formats linking positions of data to categories such as comma-separated value (CSV) formats and/or self-describing formats. Self-describing formats may include, without limitation, extensible markup language (XML), JavaScript Object Notation (JSON), or the like, which may enable processes or devices to detect categories of data.

With continued reference to refer to FIG. 4, training data 404 may include one or more elements that are not categorized. Uncategorized data of training data 404 may include data that may not be formatted or containing descriptors for some elements of data. In some embodiments, machine-learning algorithms and/or other processes may sort training data 404 according to one or more categorizations. Machine-learning algorithms may sort training data 404 using, for instance, natural language processing algorithms, tokenization, detection of correlated values in raw data and the like. In some embodiments, categories of training data 404 may be generated using correlation and/or other processing algorithms. As a non-limiting example, in a body of text, phrases making up a number "n" of compound words, such as nouns modified by other nouns, may be identified according to a statistically significant prevalence of n-grams containing such words in a particular order. For instance, an n-gram may be categorized as an element of language such as a "word" to be tracked similarly to single words, which may generate a new category as a result of statistical analysis. In a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure, without limitation.

Further referring to FIG. 4, training data 404 may be filtered, sorted, and/or selected using one or more supervised and/or unsupervised machine-learning processes and/or models as described in further detail below. In some embodiments, training data 404 may be classified using training data classifier 416. Training data classifier 416 may include a classifier. A "classifier" as used in this disclosure is a machine-learning model that sorts inputs into one or more categories. Training data classifier 416 may utilize a mathematical model, neural net, or program generated by a machine learning algorithm. A machine learning algorithm of training data classifier 416 may include a classification algorithm. A "classification algorithm" as used in this disclosure is one or more computer processes that generate a classifier from training data. A classification algorithm may sort inputs into categories and/or bins of data. A classification algorithm may output categories of data and/or labels associated with the data. A classifier may be configured to output a datum that labels or otherwise identifies a set of data that may be clustered together. Machine-learning module 400 may generate a classifier, such as training data classifier 416 using a classification algorithm. Classification may be performed using, without limitation, linear classifiers such as without limitation logistic regression and/or naive Bayes classifiers, nearest neighbor classifiers such ask-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to educational data.

Still referring to FIG. 4, machine-learning module 400 may be configured to perform a lazy-learning process 420. Lazy-learning process 420 may include a "lazy loading" or "call-when-needed" process and/or protocol. A "lazy-learning process" may include a process in which machine learning is performed upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Still referring to FIG. 4, machine-learning processes as described in this disclosure may be used to generate machine-learning models 424. A "machine-learning model" as used in this disclosure is a mathematical and/or algorithmic representation of a relationship between inputs and outputs, as generated using any machine-learning process including without limitation any process as described above, and stored in memory. For instance, an input may be sent to machine-learning model 424, which once created, may generate an output as a function of a relationship that was derived. For instance, and without limitation, a linear regression model, generated using a linear regression algorithm, may compute a linear combination of input data using coefficients derived during machine-learning processes to calculate an output. As a further non-limiting example, machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include supervised machine-learning process 428. A "supervised machine learning process" as used in this disclosure is one or more algorithms that receive labelled input data and generate outputs according to the labelled input data. For instance, supervised machine learning process 428 may include prompts as described above as input, educational content as outputs, and a scoring function representing a desired form of relationship to be detected between inputs and outputs. A scoring function may maximize a probability that a given input and/or combination of elements inputs is associated with a given output to minimize a probability that a given input is not associated with a given output. A scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include unsupervised machine-learning processes 432. An "unsupervised machine-learning process" as used in this disclosure is a process that calculates relationships in one or more datasets without labelled training data. Unsupervised machine-learning process 432 may be free to discover any structure, relationship, and/or correlation provided in training data 404. Unsupervised machine-learning process 432 may not require a response variable. Unsupervised machine-learning process 432 may calculate patterns, inferences, correlations, and the like between two or more variables of training data 404. In some embodiments, unsupervised machine-learning process 432 may determine a degree of correlation between two or more elements of training data 404.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It should also be noted that the present implementations can be provided as one or more computer-readable programs embodied on or in one or more articles of manufacture. The article of manufacture can be any suitable hardware apparatus. In general, the computer-readable programs can be implemented in any programming language. The software programs can be further translated into machine language or virtual machine instructions and stored in a program file in that form. The program file can then be stored on or in one or more of the articles of manufacture.

Figure 5:
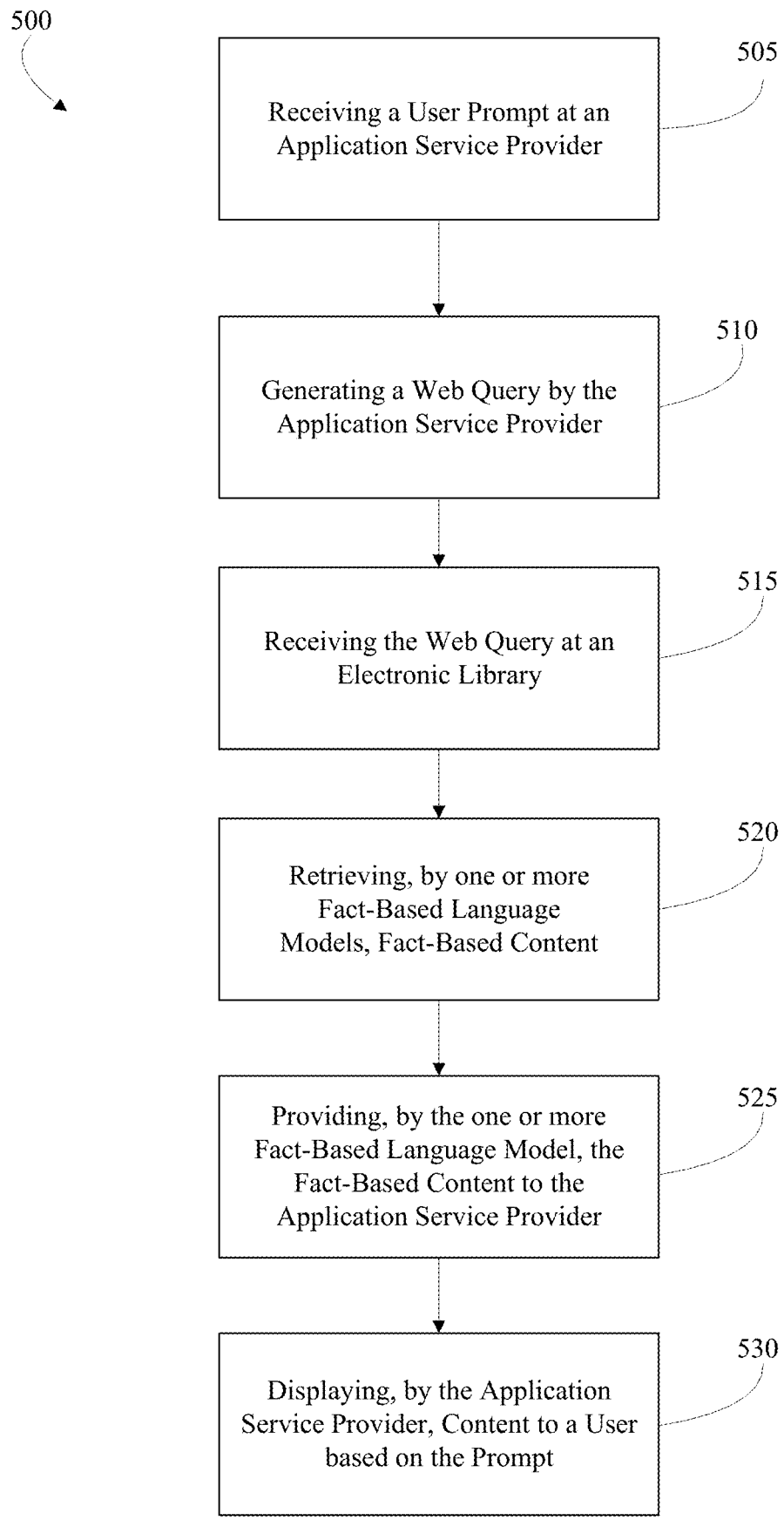
FIG. 5 illustrates an exemplary embodiment of a machine learning model.

Referring now to FIG. 5, a flowchart of a method 500 for content provisioning is presented. At step 505, a prompt is received from a user at an application service provider. A prompt may be received at one or more fact-based language models of an electronic library. A prompt may be received through user input such as, but not limited to, keyboard, mouse, touchscreen, and/or other input forms. A prompt may include an educational query, such as a question regarding a subject matter of study which includes, but is not limited to, math, science, history, English, and the like. In some embodiments, a prompt may include an instructions, such as an instruction to provide images, videos, textbook passages, and the like. A prompt may include conversational language, such as a sentence referring to a previous prompt. This step may be implemented, without limitation, as described above with reference to FIGS. 1-4.

At step 510, the application service provider generates a web query. A web query may include one or more characters, strings, phrases, symbols, and the like. The application service provider may be configured to search the Internet or other databases with the web query. A web query may be a request for content. This step may be implemented, without limitation, as described above with reference to FIGS. 1-4.

At step 515, one or more fact-based language models receives the web query from the application service provider. A fact-based language model may extract linguistic data of the web query. In some embodiments, a fact-based language model may determine a knowledge level of the web query. This step may be implemented, without limitation, as described above with reference to FIGS. 1-4.

At step 520, the one or more fact-based language model retrieves fact-based content from a electronic library. The electronic library may include propriety data. The fact-based language model may retrieve fact-based content based on the web query. This step may be implemented, without limitation, as described above with reference to FIGS. 1-4.

At step 525, the fact-based language model provides the fact-based content to the application service provider. The fact-based language model may provide various levels of fact-based content tot eh application service provider. This step may be implemented, without limitation, as described above with reference to FIGS. 1-4.

At step 530, the application service provider displays content to a user based on the prompt. The content may include at least a portion of the fact-based content provided by the fact-based language model. Displaying content may include displaying one or more citations identifying one or more fact based sources associated with the fact-based content. This step may be implemented, without limitation, as described above with reference to FIGS. 1-4.

Figure 6:
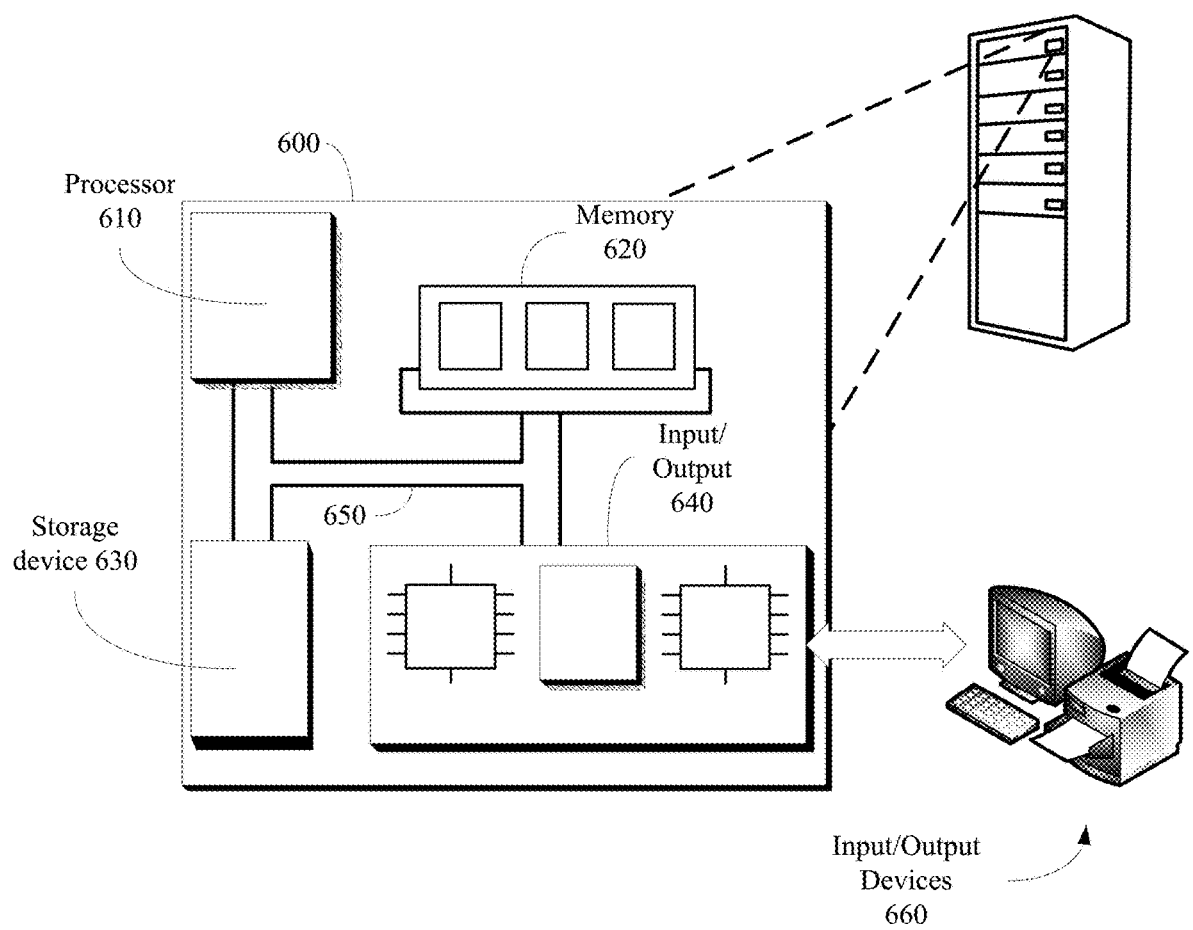
FIG. 6 illustrates an exemplary embodiment of a method of fact-based language using an fact-based language model.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. The apparatus may include disk storage and/or internal memory, each of which may be communicatively connected to each other. The system 600 may include a processor 610. The processor 610 may enable both generic operating system (OS) functionality and/or application operations. In some embodiments, the processor 610 and the memory 620 may be communicatively connected. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, the processor 610 may include any computing device as described in this disclosure, including without limitation a microcontroller, microprocessor, digital signal processor (DSP) and/or system on a chip (SoC) as described in this disclosure. The processor 610 may include, be included in, and/or communicate with a mobile device such as a mobile telephone or smartphone. The processor 610 may include a single computing device operating independently, or may include two or more computing device operating in concert, in parallel, sequentially or the like. Two or more computing devices may be included together in a single computing device or in two or more computing devices. The processor 610 may interface or communicate with one or more additional devices as described below in further detail via a network interface device. Network interface device may be utilized for connecting the processor 610 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The processor 610 may include but is not limited to, for example, a computing device or cluster of computing devices in a first location and a second computing device or cluster of computing devices in a second location. The processor 610 may include one or more computing devices dedicated to data storage, security, distribution of traffic for load balancing, and the like. The processor 610 may distribute one or more computing tasks as described below across a plurality of computing devices of computing device, which may operate in parallel, in series, redundantly, or in any other manner used for distribution of tasks or memory between computing devices. The processor 610 may be implemented using a "shared nothing" architecture in which data is cached at the worker, in an embodiment, this may enable scalability of system 600 and/or processor 610.

With continued reference to FIG. 6, processor 610 and/or a computing device may be designed and/or configured by memory 620 to perform any method, method step, or sequence of method steps in any embodiment described in this disclosure, in any order and with any degree of repetition. For instance, the processor 610 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The processor 610 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. In some implementations, the processor 610 is a programmable (or reprogrammable) general purpose microprocessor or microcontroller. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more network interface devices, e.g., an Ethernet card, a serial communication device, e.g., an RS-232 port, and/or a wireless interface device, e.g., an 802.11 card, a 3G wireless modem, or a 4G/5G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, for example as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The terms "about" or "substantially" that modify a condition or relationship characteristic of a feature or features of an embodiment of the disclosure, are to be understood to mean that the condition or characteristic is defined to within tolerances that are acceptable for operation of the embodiment for an application for which it is intended. For example, the terms "about," "substantially," and/or "close" with respect to a magnitude or a numerical value may imply to be within an inclusive range of −10% to +10% of the respective magnitude or value.

It must be noted that, as used in the specification, the singular forms "a," "an" and "the" include plural referents unless the context clearly dictates otherwise. By way of example, "an analogue" means one analogue or more than one analogue.

Each numerical value presented herein is contemplated to represent a minimum value or a maximum value in a range for a corresponding parameter. Accordingly, when added to the claims, the numerical value provides express support for claiming the range, which may lie above or below the numerical value, in accordance with the teachings herein. Every value between the minimum value and the maximum value within each numerical range presented herein (including in the figures), is contemplated and expressly supported herein, subject to the number of significant digits expressed in each particular range. Absent express inclusion in the claims, each numerical value presented herein is not to be considered limiting in any regard.

Having described certain embodiments of the disclosure, it will be apparent to those of ordinary skill in the art that other embodiments incorporating the concepts disclosed herein may be used without departing from the spirit and scope of the disclosure. Accordingly, the described embodiments are to be considered in all respects as only illustrative and not restrictive. The terms and expressions employed herein are used as terms and expressions of description and not of limitation and there is no intention, in the use of such terms and expressions, of excluding any equivalents of the features shown and described or portions thereof. The structural features and functions of the various embodiments may be arranged in various combinations and permutations, and all are considered to be within the scope of the disclosure. Unless otherwise necessitated, recited steps in the various methods may be performed in any order and certain steps may be performed substantially simultaneously and/or in parallel.

The invention claimed is:

1. A system for distributing fact-based electronic content, comprising:
an application service provider operating on a network, wherein the application service provider is configured to:
receive a user prompt; and
generate a web query requesting content based on and in response to the user prompt; and
an electronic library of one or more fact-based language models in communication with the application service provider, the fact-based language models trained with training data correlating prompts to content, wherein the fact-based language model is trained to receive prompts as input and provide fact-based content as output, wherein the fact-based language model is configured to:
receive the web query from the application service provider;

retrieve, from the electronic library, relevant fact-based content based on the web query, wherein the electronic library includes proprietary data from one or more fact sources; and provide the relevant fact-based content to the application service provider; and wherein the application service provider communicates content to a user based on the user prompt, the content including at least a portion of the relevant fact-based content from the electronic library and one or more citations identifying the one or more fact based sources associated with the fact-based content.

2. The system of claim 1, wherein the fact-based language model is further configured to retrieve relevant fact-based content based on an access status of the application service provider.

3. The system of claim 1, wherein the proprietary data of the electronic library includes one of textbooks, journals, whitepapers, professor notes, or a combination thereof.

4. The system of claim 1, wherein the application service provider includes a search engine.

5. The system of claim 1, wherein the fact-based language model is further configured to provide different forms of relevant fact-based content based on an identity of the application service provider.

6. The system of claim 1, wherein user prompt is a request for fact-based content.

7. The system of claim 1, wherein the fact-based language model is further configured to identify a level of knowledge of the user prompt and retrieve, from the electronic library, relevant fact-based content based on the level of knowledge of the user prompt.

8. The system of claim 1, wherein the application service provider includes a language model, wherein the language model of the application service provider communicates data with the fact-based language model.

9. The system of claim 1, wherein the fact-based content includes text, image, video, or a combination thereof.

10. A method of distributing fact-based content, comprising:

receiving, at an application service provider operating on a network, a user prompt; and generating, by the application service provider, a web query requesting content based on and in response to the user prompt;

receiving, by an electronic library of one or more fact-based language models in communication with the application service provider, the web query from the application service provider, wherein the one or more fact-based language models are trained with training data correlating prompts to content, wherein the one or more fact-based language models are trained to receive prompts as input and provide fact-based content as output;

retrieving, by the fact-based language model and from the electronic library, relevant fact-based content based on the web query, wherein the electronic library includes proprietary data from one or more fact sources;

providing, by the fact-based language model, the relevant fact-based content to the application service provider; and displaying, by the application service provider, content to a user based on the user prompt, the content including at least a portion of the relevant fact-based content from the electronic library and one or more citations identifying the one or more fact based sources associated with the fact-based content.

11. The method of claim 10, further comprising retrieving relevant fact-based content based on an access status of the application service provider.

12. The method of claim 10, wherein the proprietary data of the electronic library includes one of textbooks, journals, whitepapers, professor notes, or a combination thereof.

13. The method of claim 10, wherein the application service provider includes a search engine.

14. The method of claim 10, wherein providing further comprises providing, by the fact-based language model, different forms of relevant fact-based content based on an identity of the application service provider.

15. The method of claim 10, wherein user prompt is a request for fact-based content.

16. The method of claim 10, further comprising:

identifying, by the fact-based language model, a level of knowledge of the user prompt and;

retrieving, from the electronic library, relevant fact-based content based on the level of knowledge of the user prompt.

17. The method of claim 10, wherein the application service provider includes a language model, wherein the language model of the application service provider communicates data with the fact-based language model.

18. The method of claim 10, wherein the fact-based content includes text, image, video, or a combination thereof.

* * * * *

UNITED STATES PATENT AND TRADEMARK OFFICE
CERTIFICATE OF CORRECTION

PATENT NO. : 12,050,880 B1  
APPLICATION NO. : 18/392036  
DATED : July 30, 2024  
INVENTOR(S) : James Chilton et al.

Page 1 of 1

It is certified that error appears in the above-identified patent and that said Letters Patent is hereby corrected as shown below:

On the Title Page

At item (72) Inventors, add:
--Jay Mehta, Newton, MA (US)
Thais Alencar, Newton, MA (US)--

In the Specification

Column 2, Line numbers 48-49, delete "FIG. 4 illustrates a block diagram of users in different access statuses accessing content books;"

Column 2 Line number 50, replace "FIG. 5" with --FIG. 4--

Column 2, Line number 52, replace "FIG. 6" with --FIG. 5--

Column 2, Line number 55, insert --FIG. 6 illustrates an example computer system for implementing the systems and methods as described herein.--

Signed and Sealed this
Eighteenth Day of February, 2025

Coke Morgan Stewart
*Acting Director of the United States Patent and Trademark Office*